United States Patent Office.

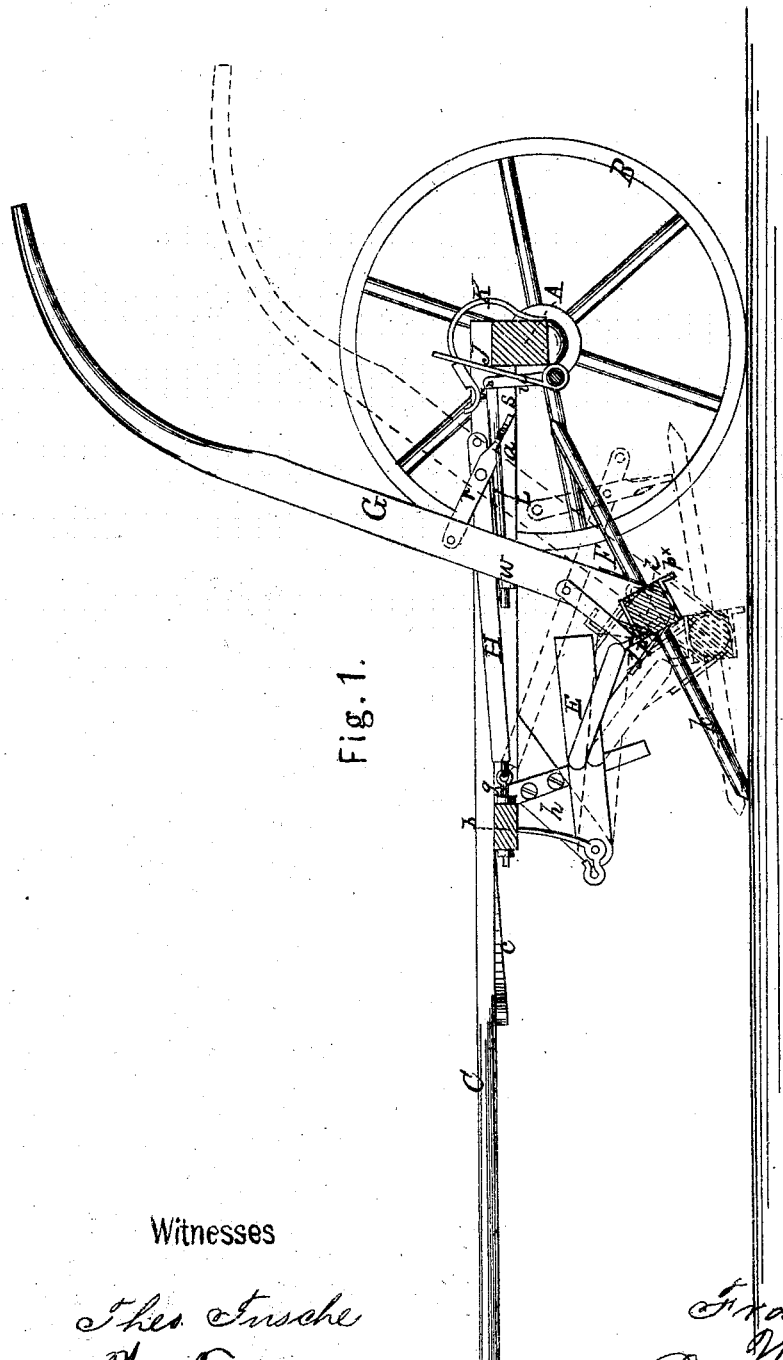

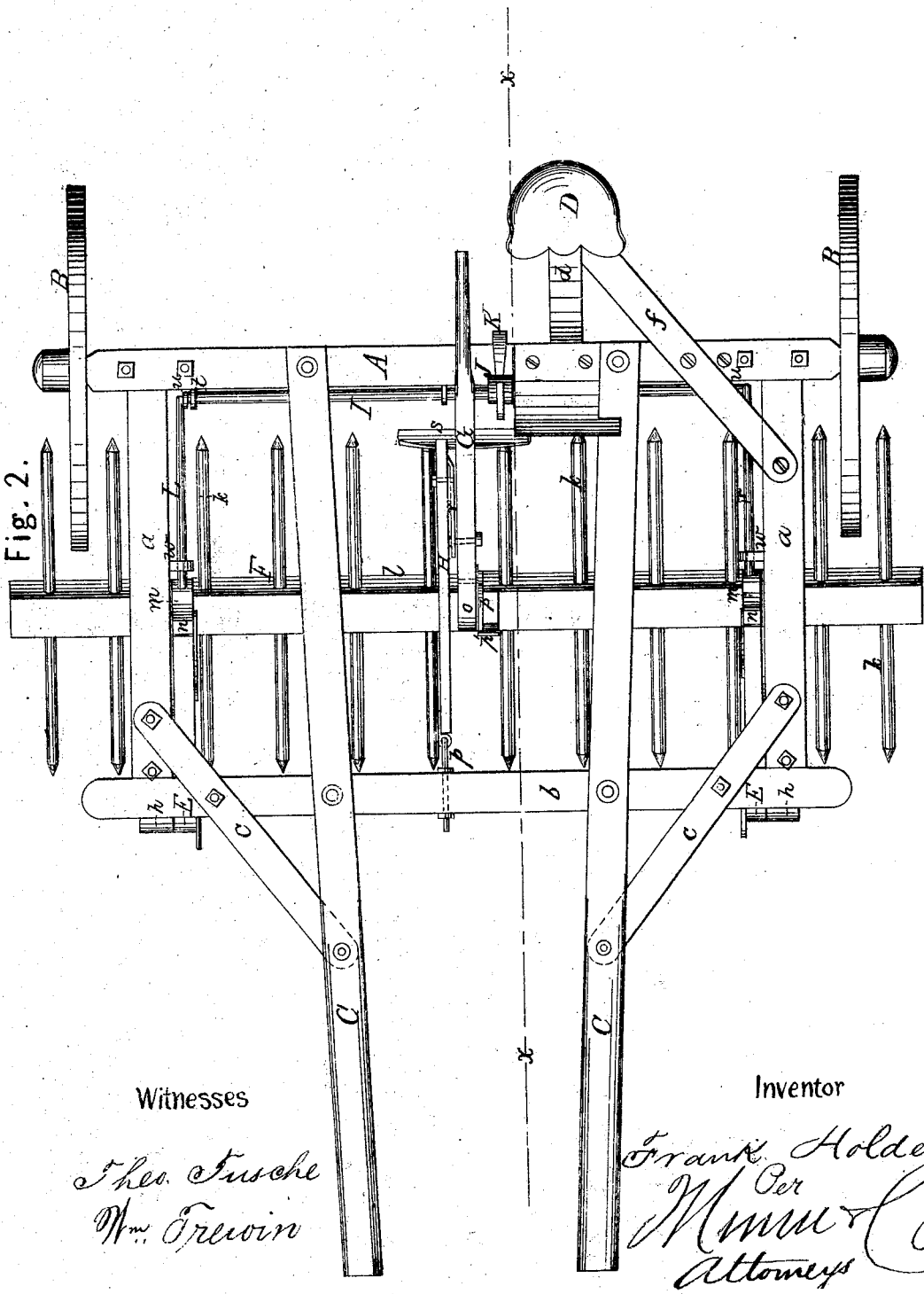

FRANK HOLDEN, OF LITCHFIELD, ILLINOIS.

Letters Patent No. 69,667, dated October 8, 1867.

---

IMPROVEMENT IN HORSE-RAKES.

---

The Schedule referred to in these Letters Patent and making part of the same.

---

TO ALL WHOM IT MAY CONCERN:

Be it known that I, FRANK HOLDEN, of Litchfield, in the county of Montgomery, and State of Illinois, have invented a new and improved Horse-Rake; and I do hereby declare that the following is a full, clear, and exact description thereof, which will enable others skilled in the art to make and use the same, reference being had to the accompanying drawings forming part of this specification, in which—

Figure 1 is a side sectional view of my invention, taken in the line $x\ x$, fig. 2.

Figure 2, a plan or top view of the same.

Similar letters of reference indicate like parts.

This invention relates to a new and improved revolving horse-rake, and it consists in a novel construction of the same, and a peculiar arrangement of parts, as hereinafter fully shown and described, whereby several advantages are obtained which will be hereinafter alluded to.

A represents an axle, having a wheel, B, on each end of it, and $a\ a$ are two parallel bars, the rear ends of which are framed into the front side of the axle, the front ends of the bars $a\ a$ being connected by a cross-bar, $b$, the whole forming a rectangular frame. C C are thills which are attached to said frame, and secured in position by brace-rods $c\ c$, and D is the driver's seat, attached to a support or standard, $d$, on the axle A, and braced by a rod from a bar, $f$, secured obliquely on the rear part of the framing at its left-hand side. To the rear side of the axle A a step is attached to facilitate the driver getting upon his seat. To the front part of each side bar $a\ a$ of the framing there is attached an oblique pendent bar, $h$, and to the lower ends of these bars there are secured by pivots $i$ arms E E, having bars $j\ j$ framed into their lower ends at obtuse angles. F represents a rake, which is composed of a series of wooden teeth, $k$, passing through a head, $l$, and projecting at equal distances from the opposite sides of it, as usual. The rake-head $l$ is secured to the lower ends of the bars $j\ j$ by metal straps, $m$, the rake-head being allowed to turn freely in said straps, and each strap has a hook, $n$, attached, the use of which will be presently shown. G represents a lever, the lower end of which is connected by a metal strap, $o$, with the centre of the rake-head $l$. The lower part of this lever has a pawl, $p$, pivoted to it to engage with hooks $p^*\ p^*$ on the rake-head, and a bar, H, which is connected by a joint, $q$, with the front bar $b$ of the framing, is connected at its rear end with the lever G by a link, $r$, having a cross-head, $s$, at its lower end. To the front side of the axle A a shaft, I, is fitted in bearings $t\ t$, and is turned by means of a foot-lever, J, attached to it, a spring-catch or fastening, K, which is attached to the axle, passing through the upper part of the lever J. Each end of the shaft I has a crank, $u$, formed on it, and the outer ends of these cranks are connected by pivots, $v$, to sliding rods L L, which are fitted in guides $w$ at the inner surfaces of the side pieces $a\ a$ of the framing, said rods L being in line with the hooks $u$ on the straps $m$.

The above parts comprise all the parts of the invention, and the operation is as follows: As the machine is drawn along the rake is kept to its work by means of the cross-head $s$ of the link $r$. When the rake has collected or gathered up a load the driver, by simply raising the lever G, and thereby the cross-head $s$, admits of the rake making a semi-revolution in order that it may discharge its load, the revolving movement of the rake being stopped in consequence of the pawl $p$ engaging with the hook $p^*$. The rake, it will seen, in consequence of being hung as shown, is allowed to rise as it turns, and the rake may be suspended in an elevated state at any time when required, as, for instance, in drawing the rake from place to place, by operating the foot-lever J, and thereby turning the shaft I, so that the cranks $u\ u$ may throw forward the rods L under the hooks $n$. The rake, it will also be seen, works in front of the wheels B B, and underneath the framing of the machine.

What I claim as new, and desire to secure by Letters Patent, is—

1. The sliding rods L L, connected with the shaft I, operated through the medium of the foot-lever J, in combination with the hooks $n\ n$ on the straps $m\ m$, in which the rake-head $l$ is fitted, arms E E, and pendants $h\ h$, substantially as and for the purpose specified.

2. In combination with the above I claim the arms E E supporting the rake, and pivoted to the oblique pendants $h\ h$, substantially as described for the purpose specified.

FRANK HOLDEN.

Witnesses:
JONATHAN A. WICKERSHAM,
GEO. F. BLOCKBURGER.